United States Patent [19]

Masui et al.

[11] Patent Number: 5,392,435
[45] Date of Patent: Feb. 21, 1995

[54] MICROCOMPUTER HAVING A SYSTEM CLOCK FREQUENCY THAT VARIES IN DEPENDENCE ON THE NUMBER OF NESTED AND HELD INTERRUPTS

[75] Inventors: Norio Masui; Shigeo Mizugaki, both of Hyogo, Japan

[73] Assignee: Mitsubishi Denki Kabushiki Kaisha, Tokyo, Japan

[21] Appl. No.: 129,008

[22] Filed: Sep. 29, 1993

Related U.S. Application Data

[63] Continuation of Ser. No. 813,313, Dec. 23, 1991, abandoned.

[30] Foreign Application Priority Data

Dec. 25, 1990 [JP] Japan .................................. 2-413637

[51] Int. Cl.$^6$ ............................................. G06F 1/08
[52] U.S. Cl. .................................. 395/725; 395/550; 364/230.2; 364/DIG. 1
[58] Field of Search ........................ 395/725, 750, 550; 364/230.2, 230.8, DIG. 1, 941, 941.3, DIG. 2

[56] References Cited

U.S. PATENT DOCUMENTS

| | | | |
|---|---|---|---|
| 3,594,732 | 7/1971 | Mendelson | 395/725 |
| 4,023,143 | 5/1977 | Braunstein | 395/725 |
| 4,488,227 | 12/1984 | Min et al. | 395/725 |
| 4,636,944 | 1/1987 | Hodge | 395/725 |
| 4,987,529 | 1/1991 | Craft et al. | 395/325 |
| 5,047,919 | 9/1991 | Sterling et al. | 395/725 |
| 5,115,506 | 5/1992 | Cohen et al. | 395/725 |
| 5,161,226 | 11/1992 | Wainer | 395/650 |
| 5,163,146 | 11/1992 | Antanaitis, Jr. et al. | 395/550 |

FOREIGN PATENT DOCUMENTS 2246455A 1/1992 United Kingdom .

OTHER PUBLICATIONS

"Product Outline Report:NPC Series", Nikkei Data Processing, Jan. 1989, pp. MC2-303-651 thru MC2-30-3-654.

*Primary Examiner*—Jack B. Harvey
*Assistant Examiner*—Glenn A. Auve
*Attorney, Agent, or Firm*—Townsend and Townsend Khourie and Crew

[57] ABSTRACT

A microcomputer provided with improved interrupt handling. The frequency of a clock signal supplied to the central processing unit is increased to shorten the interrupt holding time when relatively many interrupts are occurring. When few interrupts are occurring, the frequency of the clock signal is decreased thereby reducing power consumption. The invention includes a holding factors register for storing the number of interrupt factors being held by an interrupt controller and an interrupt nesting counter for storing the number of nested interrupts in the central processing unit. The numbers stored in the holding factors register and interrupt nesting counter are compared to preset numbers. A clock control circuit changes the frequency of the system clock signal in accordance with the comparison result thereby changing the frequency of the clock signal depending on the number of occurrences of interrupts.

2 Claims, 6 Drawing Sheets

TRUTH TABLE OF DECODER (18)

| OUTPUT OF COMPARATOR CIRCUIT (12) | OUTPUT OF COMPARATOR CIRCUIT (13) | SIGNAL TO THREE-STATE BUFFER (19) | SIGNAL TO THREE-STATE BUFFER (20) | SIGNAL TO THREE-STATE BUFFER (21) |
|---|---|---|---|---|
| 0 0 | 0 0 | 0 | 0 | 1 |
| 0 0 | 0 1 | 0 | 1 | 0 |
| 0 0 | 1 0 | 1 | 0 | 0 |
| 0 1 | 0 0 | 0 | 1 | 0 |
| 0 1 | 0 1 | 0 | 1 | 0 |
| 0 1 | 1 0 | 1 | 0 | 0 |
| 1 0 | 0 0 | 1 | 0 | 0 |
| 1 0 | 0 1 | 1 | 0 | 0 |
| 1 0 | 1 0 | 1 | 0 | 0 |

MICROCOMPUTER HAVING A SYSTEM CLOCK FREQUENCY THAT VARIES IN DEPENDENCE ON THE NUMBER OF NESTED AND HELD INTERRUPTS

This is a continuation of application Ser. No. 07/813,313, filed Dec. 23, 1991, now abandoned.

FIELD OF THE INVENTION

The present invention relates generally to a microcomputer and specifically to a microcomputer provided with an interrupt control function.

DESCRIPTION OF THE PRIOR ART

In a typical microcomputer, interrupt control includes assigning a priority value to each of a plurality of interrupts that may occur, and processing the interrupts according to the priorities by using a central processing unit ("CPU") having a system clock signal at a constant frequency. A conventional example of interrupt control in a microcomputer is illustrated in FIGS. 8–11.

Figure 8:
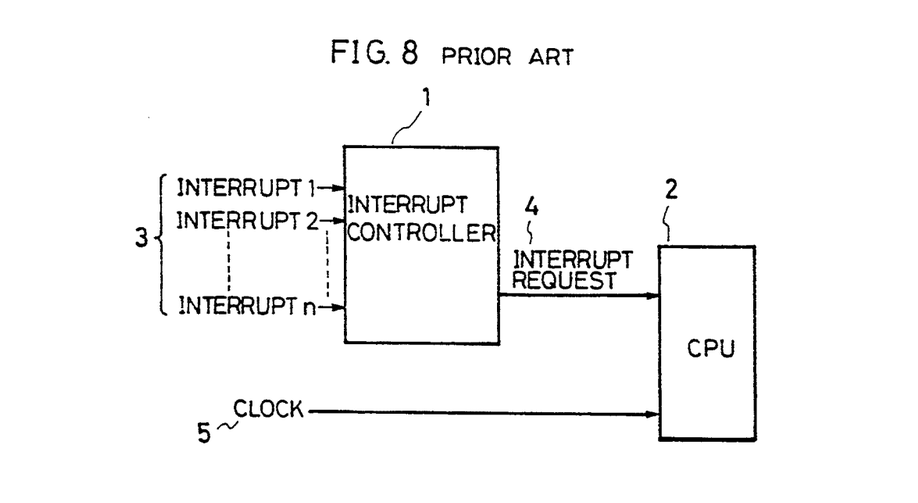
FIG. 8 is a block diagram showing the flow of the interrupt control in a conventional microcomputer.

FIG. 8 is a block diagram showing the flow of the interrupt control in a conventional microcomputer. In FIG. 8, interrupt controller 1 controls the selection of interrupts to be processed and CPU 2 processes the interrupt requests. Interrupt request signals shown at 3, such as INTERRUPT1, INTERRUPT2, ..., INTERRUPTn are individual interrupt request signals. Interrupt signal 4 from interrupt controller 1 to CPU 2 indicates the selected interrupt to be processed, and clock signal 5 is the system clock supplied to CPU 2.

Figure 9:
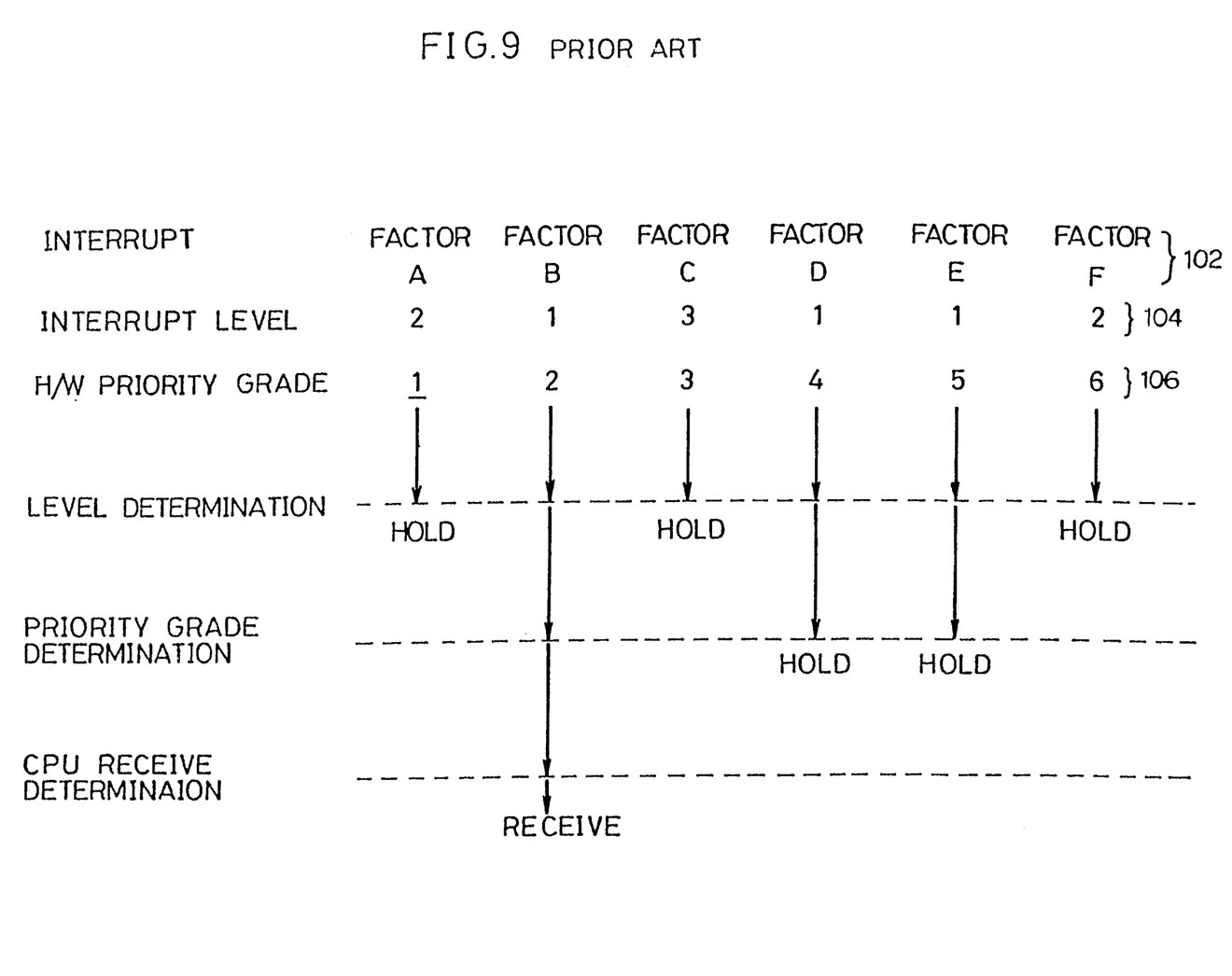
FIG. 9 is a diagram showing the interrupt control operation in a conventional microcomputer.

FIG. 9 is a schematic diagram showing the interrupt control operation at a time where six interrupt requests are generated at the same time in the conventional example. In the FIG., factor A, ..., factor F at 102 represent interrupt requests generated at the same time. Interrupt levels at row 104 denote priority grades which are set with respect to software in each factor. Hardware ("H/W") priority grades are shown at row 106 in FIG. 9 are determined by hardware. For both the interrupt level and H/W priority grade numbers at rows 104 and 106, respectively, the smaller the number, the higher the priority of the interrupt level or H/W priority grade. A higher priority means that the interrupt corresponding with the higher priority interrupt level will be processed before interrupts of lower priority.

Figure 10:
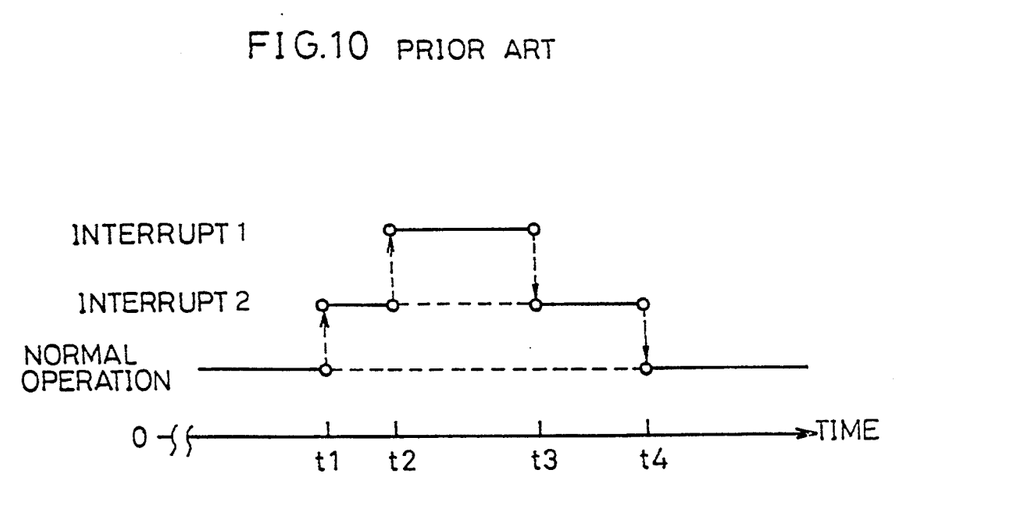
FIG. 10 is a diagram showing the processing of interrupts by a CPU for a prior art microcomputer.
Figure 11:
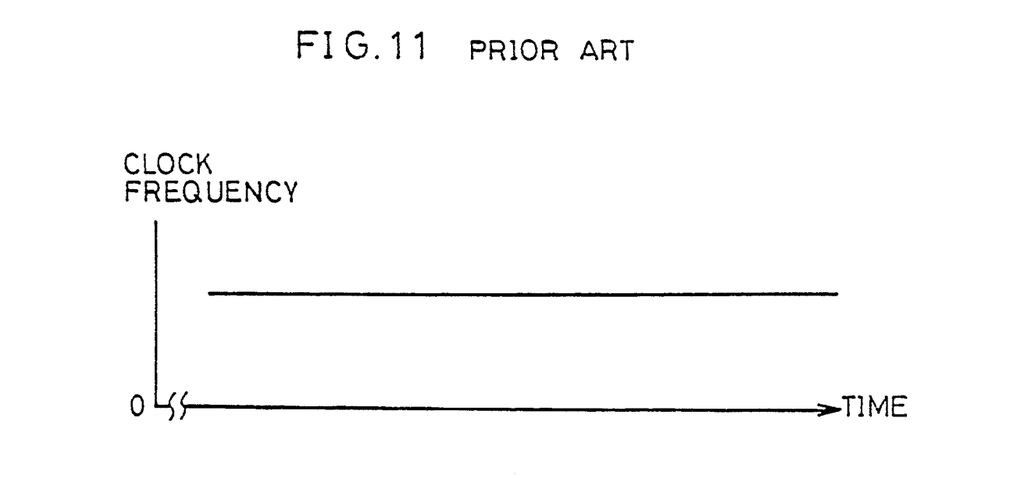
FIG. 11 is a diagram showing the hourly variation of the frequency of a clock signal supplied to the CPU of a conventional microcomputer.

FIG. 10 is a diagram illustrating execution, or "handling", of two interrupts, INTERRUPT1 and INTERRUPT2, in a CPU of a conventional microcomputer. In FIG. 10, solid lines denote processes under execution while dotted lines denote processes that are being held. The interrupt priority of INTERRUPT2 is higher than that of INTERRUPT1. FIG. 11 is a diagram showing the variation with time of the frequency of clock signal 5 of FIG. 1 supplied to CPU 2. Referring to FIGS. 8 and 9, the case where multiple interrupt requests are generated at the same time will be explained. Referring to FIG. 8, interrupt request signals at 3 correspond to interrupt factors A, B, ..., F of FIG. 9 and are input to interrupt controller 1 of FIG. 8. Interrupt controller 1 checks the interrupt factors and determines interrupt levels. As a result, all factors corresponding to an interrupt level below that of "1", namely, those factors other than factors B, D, and E, are held. Although the interrupt levels of the factors B, D, and E are the same, the factors D and E will be held as a result of the priority grades determined by H/W. Thus, only interrupt request signal 4 of the factor B is set to CPU 2. CPU 2 determines whether to execute the received factor B or to hold the interrupt for later execution. The number of factors of interrupts need not be restricted to six. The operation is the same as the above even if the number of factors is different from the above example.

FIG. 10 shows the case where an interrupt request having a higher priority grade than an interrupt request which has been received at CPU 2 and being executed thereby is generated. An interrupt request for INTERRUPT2 is generated at a time t1 and CPU 2 receives it and holds, or suspends, the normal operation so as to process INTERRUPT2. Further, it is assumed that an interrupt request for INTERRUPT1 is generated at time t2. INTERRUPT1 will be held if the interrupt level of INTERRUPT1 is lower than the interrupt level of INTERRUPT2 in the priority grade. However, since INTERRUPT1 is higher than INTERRUPT2 in the priority grade, CPU 2 receives the interrupt request of INTERRUPT1, the processing of INTERRUPT2 is held and INTERRUPT1 is, instead, processed. The act of suspending a first interrupt in order to process a second interrupt is called a "nesting" of interrupt processing.

When processing of INTERRUPT1 is completed at time t3, the processing of INTERRUPT2 which had been held is resumed. When the processing of INTERRUPT2 is completed at time t4, the normal operation which had been held is restored. In addition, although not shown, when an interrupt request having a higher interrupt level than that of INTERRUPT1 in the priority grade is generated during the processing of INTERRUPT1, CPU 2 receives and processes the interrupt so that the number of nested interrupts becomes 3. The same process will be repeated for interrupt requests of a higher priority which occur thereafter. Referring to FIG. 11, the frequency of the clock signal supplied to the CPU is always constant and the CPU operates at a constant speed.

The conventional microcomputer performs the interrupt controls as described above, being operated by a clock signal having a constant frequency. In this case, when the frequency of the clock signal supplied to the CPU is reduced in order to reduce power consumption, the holding time for interrupts becomes longer. Alternatively, if the frequency of the clock signal supplied to the CPU is set high in order to shorten the holding time for interrupts, the processing of interrupts is executed quickly even when the number of interrupts is small and such quick processing is unnecessary, thereby wasting power.

SUMMARY OF THE INVENTION

An aspect of the present invention, in view of the above-mentioned problem, is to provide a microcomputer in which the interrupt holding time is controlled in accordance with the number of generated interrupt requests so that power consumption is reduced when fast interrupt processing is not needed.

The microcomputer of the present invention comprises a holding factors register for holding the number of interrupt factors being held by an interrupt controller, an interrupt nesting counter for counting the number of nestings of interrupts processed by the CPU, and a clock control circuit for changing the frequency of the clock signal supplied to the CPU depending on the contents of the holding factors register, interrupt nesting counter, and values stored in one or more registers.

The clock control circuit evaluates the number of interrupt factors being held as indicated by the value in the holding factors register and in the interrupt nesting counter. The clock control circuit performs this evaluation each time an interrupt request occurs and the number of nestings in the interrupt nesting counter changes. When multiple interrupts are generated, the frequency of the clock signal supplied to CPU 2 is made high. The frequency of the clock supplied to CPU 2 is made low when the number of interrupts is small.

The above and other aspects, features, and advantages of the invention will become more apparent from the following description when taken in conjunction with the accompanying drawings.

DESCRIPTION OF THE PREFERRED EMBODIMENT

Figure 1:
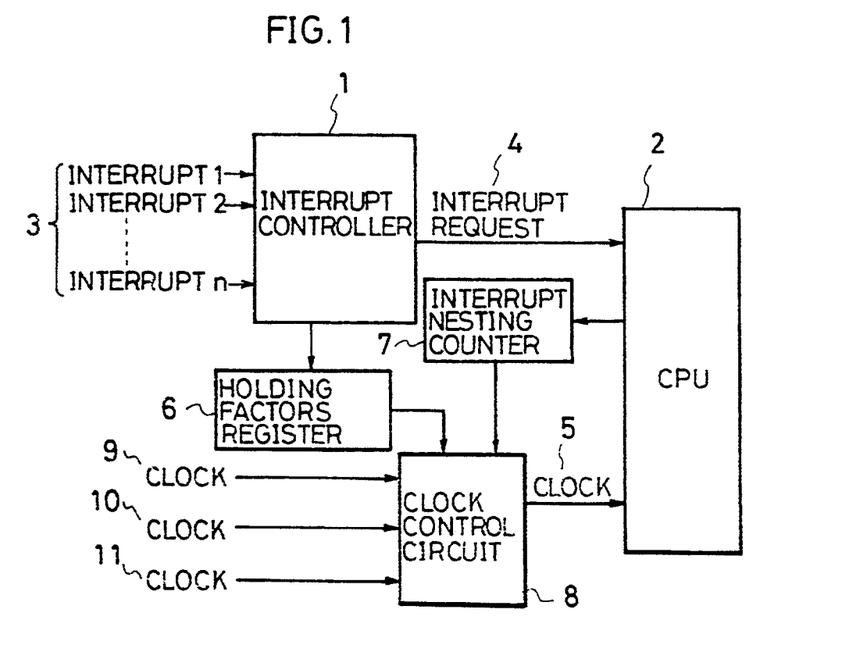
FIG. 1 is a block diagram showing interrupt and clock signals in a microcomputer according to a first embodiment of the present invention.

FIG. 1 is a block diagram showing the flow of interrupt and clock signals of a microcomputer according to a first embodiment of the present invention. In FIGS. 1 and 8, and generally, identically numbered items between two or more FIGS. denote identical items and any previous explanation with regard to those items applies. In FIG. 1, holding factors register 6 is used to keep track of the number of interrupt factors being held by interrupt controller 1. Interrupt nesting counter 7 counts the number of nestings of interrupts. By "nesting" it is meant that the CPU is holding (or suspending the processing of) a main process, or one or more interrupt processes, in order to process an interrupt with a higher priority grade than the processes being held. After the CPU completes processing an interrupt of higher priority grade, the CPU will return to process the interrupt of next highest priority. Clock control circuit 8 is used to change the frequency of the clock signal supplied to CPU 2 in accordance with the value in holding factors register 6 and the value in interrupt nesting counter 7. Clock signals 9, 10 and 11 are, in the preferred embodiment, 20 MHz, 16 MHz, and 8 MHz frequencies, respectively, which are input to clock control circuit 8 and are used to derive clock signal 5.

Figure 2:
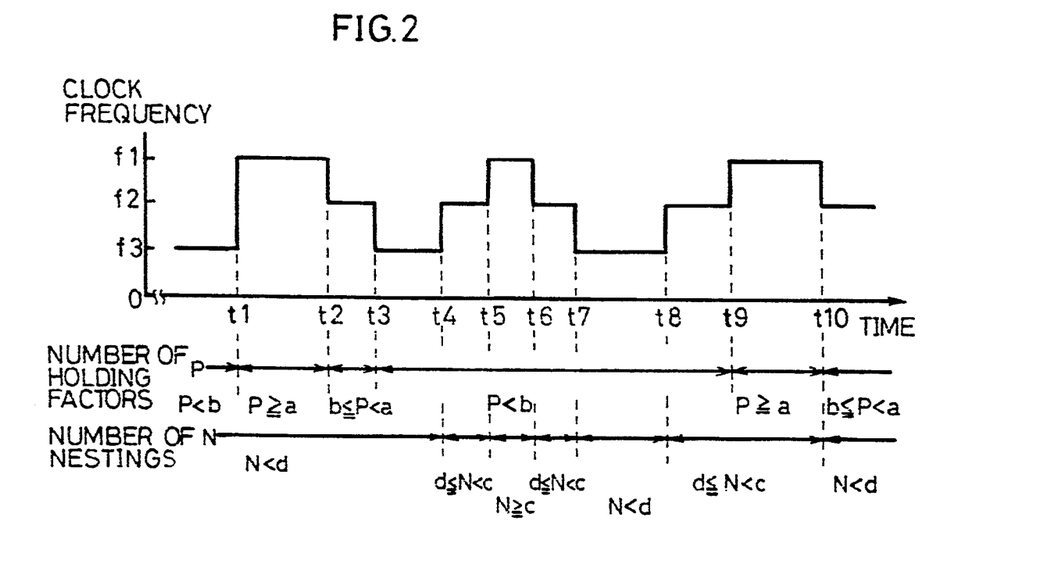
FIG. 2 is a diagram showing the hourly variation of the frequency of the clock signals supplied to a CPU in the first embodiment.

FIG. 2 is a diagram showing the hourly variation of the frequency of clock signal 5 supplied to CPU 2. In FIG. 2, reference number f1 represents the frequency of clock signal 9, f2 denotes the frequency of clock signal 10, and f3 denotes the frequency of clock signal 11. "P" denotes the number of holding interrupt factors which is the value stored in holding factors register 6 (hereinafter simply called the "number of holding factors"), "N" denotes the number of nestings which is the value of interrupt nesting counter 7 ("number of interrupt nestings"), while "a", "b", "c" and "d" represent values preset in clock control circuit 8. When the number of holding factors equals either of the preset values denoted by "a" and "b" the clock frequency will be changed. Also, when the number of interrupt nestings equals either of preset values "c" or "d" the clock frequency will be changed, with potential conflicts resolved as discussed below. The values for a, b, c and d are preset depending upon the number of interrupt request signals "n", at 3 in FIG. 1. For example, when the number of interrupt request signals, n, is 7, a is preset to a value of 3, b is preset to a value of 1, c is preset to a value of 3, and d is preset to a value of 1.

Figure 3:
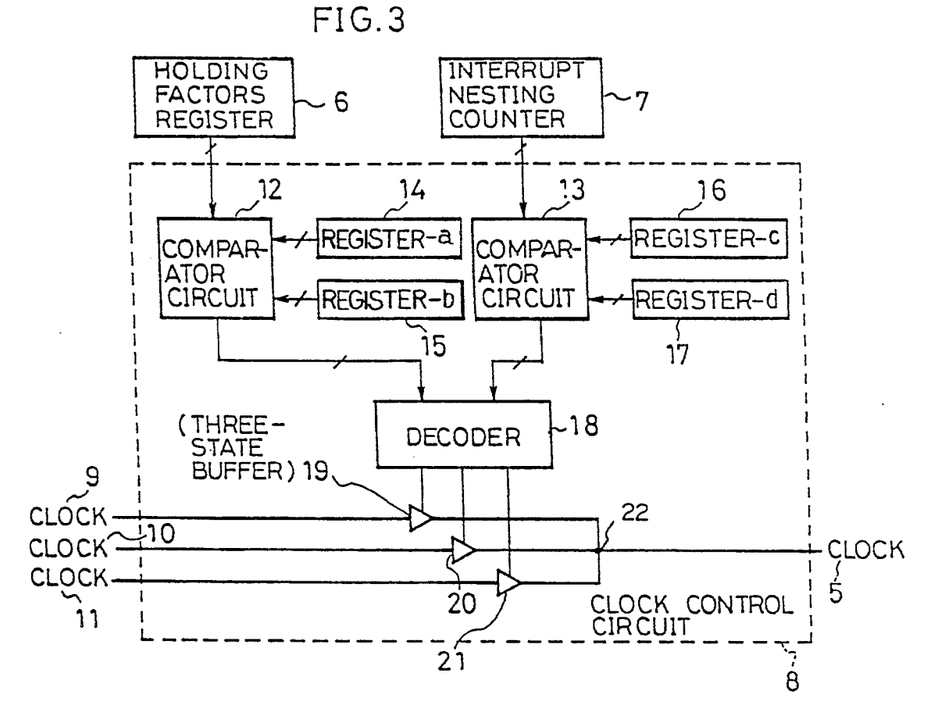
FIG. 3 is a block diagram with a clock controlled circuit in FIG. 1.

FIG. 3 is a block diagram showing the clock control circuit 8 in the above embodiment. In FIG. 3, registera at 14 stores the value for "a" described above. Similarly, registerb at 15 is used to store the value of the value of "b" described above while registerc at 16 and registerd at 17 hold values for "c" and "d", respectively. First comparator circuit 12 compares the value of holding factors register 6 with the value of registers 14 and 15. Second comparator circuit 13 compares the value of interrupt nesting counter 7 with the values of registers 16 and 17. Decoder 18 is used for decoding the outputs of comparator circuits 12 and 13. Three tri-state buffers 19, 20 and 21 are controlled by the outputs of decoder 18. Node 22 is the common output of each of the three tri-state buffers 19, 20 and 21.

Figure 4:
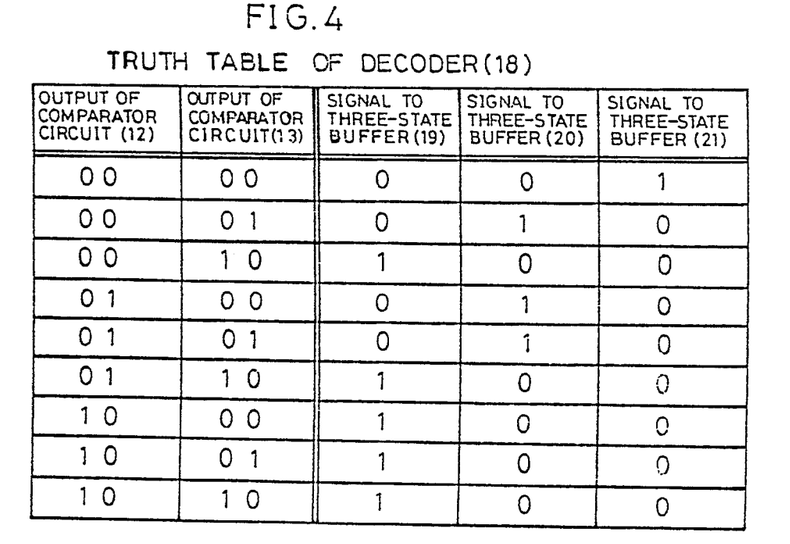
FIG. 4 is a diagram showing a truth table of a decoder of FIG. 3.

FIG. 4 is a truth table of decoder 18, showing relationships of the control signals to the tri-state buffers 19, 20 and 21 in relation to comparator circuits 12 and 13 of FIG. 3.

The operation of the embodiment will be explained hereinafter. Firstly, the operation of clock control circuit 8 in FIG. 3 will be explained.

The value "P" of holding factors register 6, the value "a" of register 14, and the value "b" of register 15 are input to comparator circuit 12. Comparator circuit 12 compares the value "P" of holding factors register 6 with value "a" of register 14, and the value "P" of holding factors register 6 with the value "b" of register 15. As a result of the comparisons, comparator circuit 12 outputs "10" at $P \geq a$, "01" at $b \leq P < a$, and "00" at $P < b$.

Comparator circuit 13 is similar to comparator circuit 12. The value "N" of interrupt nesting counter 7, the value "c" of register 16, and the value "d" of register 17 are input to comparator circuit 13. Comparator circuit 13 compares the value "N" of interrupt nesting counter 7 with the value "c" of register 16, and the value "N" of interrupt nesting counter 7 with the value "d" of register 17. As a result of the comparisons, comparator circuit 13 outputs "10" at $N \geq c$, "01" at $d \leq N < c$, and "00" at $N < d$.

The outputs of comparator circuits 12 and 13 are input to decoder 18. Decoder 18 produces 3 output signals which are input to the three tri-state buffers 19, 20, and 21, respectively. Decoder 18 operates in accordance with the truth table shown in FIG. 4.

Clock signal 9 is input to tri-state buffer 19, clock signal 10 is input to tri-state buffer 20 and clock signal 11 is input to tri-state buffer 21. The outputs of the three tri-state buffers 19, 20, and 21 are, respectively, connected to node 22 so that a selected one of the outputs is output as clock signal 5. The three tri-state buffers 19, 20, and 21 are deenergized when the output signal from decoder 18 is "0", and energized when the output signal from decoder 18 is "1". For example, when the output signal to tri-state buffer 19 from decoder 18 is "1" and the output signals to the tri-state buffers 20 and 21 is "0" clock signal 9 is output as clock signal 5.

Referring to FIGS. 1 through 4, the overall operation of the embodiment will be explained hereinafter.

The interrupt control operation by interrupt controller 1 and the interrupt processing operation by CPU 2 are performed in the same way as the conventional example shown in FIGS. 9 and 10. Interrupt controller 1 loads interrupt factors register 6 with the number of interrupt factors being held. Interrupt nesting counter 7 counts the number of nestings of interrupted processes of CPU 2. Clock control circuit 8 supplies to CPU 2 the clock signal 9 having the highest frequency, f1, at $P \geq a$ or at $N \geq c$, and supplies to CPU 2 the clock signal 10 having the frequency f2 at $b \leq P < a$ or at $d \leq N < c$, and supplies to CPU 2 the clock signal 11 having the lowest frequency f3 at $P < b$ or at $N < d$. When the clock frequency selected in dependence on the number of holding factors, P, differs from the clock frequency selected in dependence on the number of nestings, N, the clock signal having a higher frequency is supplied to CPU 2. For example, when $b \leq P < a$ and $N < d$, clock signal 10 is supplied to CPU 2. In FIG. 2, $N < d$ prior to time t4. Here, as $P < b$ prior to time t1, clock signal 11 having frequency f3 is supplied to CPU 2. Between times t1 to t2 clock signal 9 having frequency f1 is supplied to CPU 2. From time t2 to time t3 $b \leq P < a$ and clock signal 10 having frequency f2 is supplied to CPU 2.

$P < b$ from time t3 to time t9. This overlaps with $N < d$ from time t3 to time t4 and clock signal 11 having frequency f3 is therefore supplied to CPU 2. Since $d \leq N < c$ exists from time t4 to time t5, clock signal 10 having frequency f2 is supplied to CPU 2. Since $N \geq c$ from time t5 to time t6, clock signal 9 having frequency f1 is supplied to CPU 2. Since $d \leq N < c$ from time t6 to time t7, clock signal 10 having frequency of 2 is supplied to CPU 2. $N < d$ from time t7 to time t8, and, therefore, clock signal 11 having frequency f3 is supplied to CPU 2. From time t8 to time t10, $d \leq N < c$ while $P \geq a$ from time t9 to time t10, so that clock signal 10 having frequency f2 is supplied to CPU 2 from time t8 to time t9. From time t9 to time t10, clock signal 9 having frequency f1 is supplied to CPU 2. After time t10, $b \leq P < a$ and $N < d$ so that clock signal 10 having frequency f2 is supplied to CPU 2.

In the above-mentioned first embodiment, two values are preset for the number of holding factors and the number of nestings and one of three clock signals is selected. However, the number of clock signals, number of values for the holding factors, and number of values for nestings may vary from the numbers given in the above discussion of the preferred embodiment.

Figure 5:
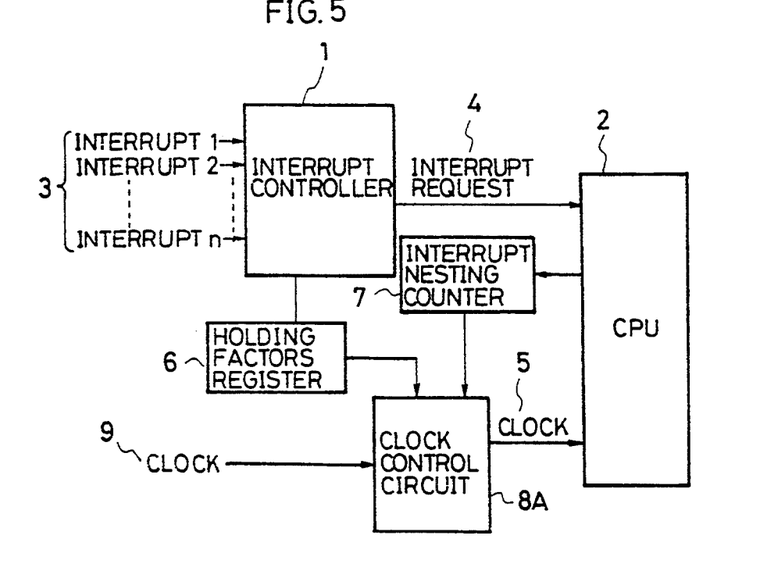
FIG. 5 is a block diagram showing interrupted clock signals in a microcomputer according to a second embodiment of the present invention.

FIG. 5 is a block diagram showing the interrupt and clock signals of a microcomputer relating to a second embodiment of the present invention. Elements numbered identically between FIGS. 5 and 1 are identical elements and a description of these identical elements in connection with FIG. 5 will be omitted.

Figure 6:
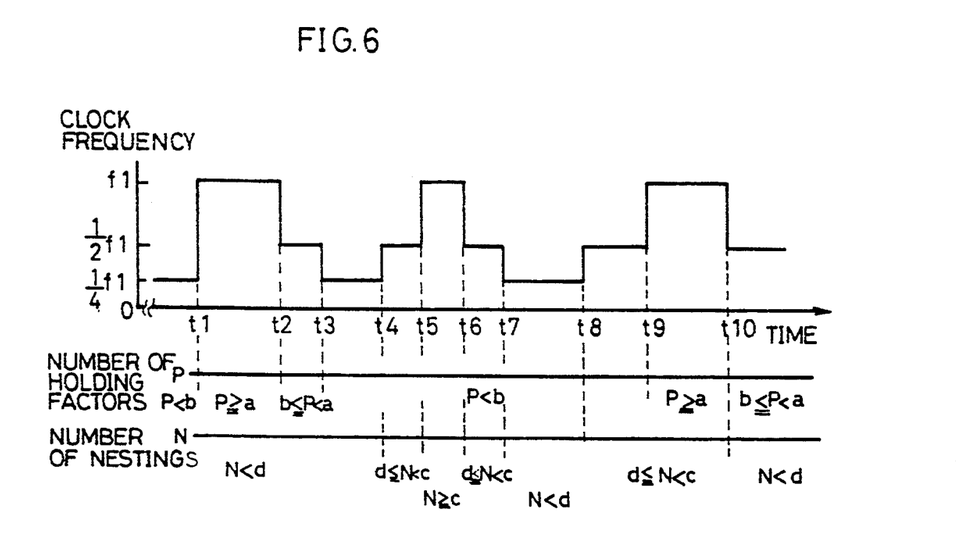
FIG. 6 is a diagram showing the hourly variation of the frequency of the clock signals supplied to the CPU in the second embodiment.

In FIG. 5, clock control circuit 8A has a different structure from the first embodiment, which will be explained later. FIG. 6 is a diagram showing the hourly variation of the frequency of clock signal 5 supplied to CPU 2 in the second embodiment.

Figure 7:
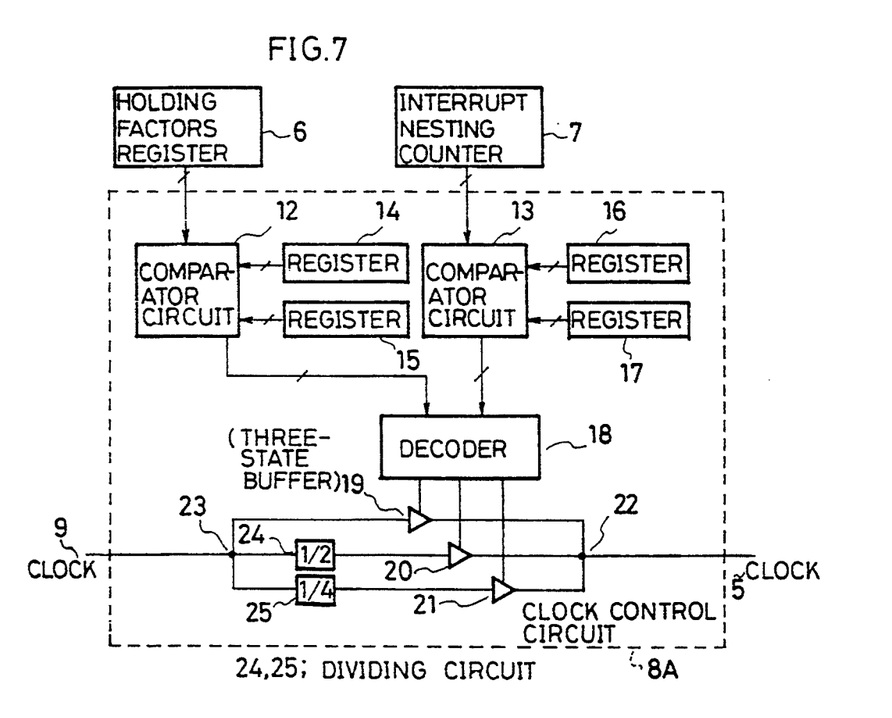
FIG. 7 is a block diagram of the clock control circuit in FIG. 5.

FIG. 7 is a block diagram showing clock control circuit 8A in FIG. 5. In general, identically numbered elements between figures are used to designate identical elements. In FIG. 7, input node 23 is coupled to divide by 2 circuit 24 and divide by 4 circuit 25. Divide by 2 circuit 24 divides input clock signal 9 into a signal with a frequency of one-half of clock signal 9, while divide by 4 circuit 25 divides clock signal 9 into a signal having a frequency of ¼ that of clock signal 9.

Next, the operation of the second embodiment will be explained.

Firstly, the operation of clock control circuit 8A will be explained. Clock control circuit 8A differs from the clock control circuit of the first embodiment in that there is only one clock signal 9 having frequency f1 input to clock control circuit 8A, the other clock signals provided by dividing circuits 24 and 25. Input clock signal 9 is divided into three signal lines at node 23 which are input to tri-state buffer 19 and to dividing circuits 24 and 25. Dividing circuit 24 outputs a clock signal having a frequency $(\frac{1}{2}) \cdot f1$ input to tri-state buffer 20. The output signal of dividing circuit 25 is a clock signal having a frequency of $(\frac{1}{4}) \cdot f1$ input to tri-state buffer 21. The three tri-state buffers 19, 20, and 21, are selected by the control signal from decoder 18 similar to the discussion of decoder 18 in connection with FIG. 3 and the table of FIG. 4, above. The selected tri-state buffer outputs an input clock signal as clock signal 5 through node 22 of FIG. 7.

Referring to FIGS. 5–7, the overall operation of the second embodiment will be explained.

The interrupt control operation by interrupt controller 1 and the interrupt processing operation by CPU 2 are performed in the same way as in the conventional system shown in FIGS. 9 and 10. Interrupt factors register 6 and interrupt nesting counter 7 have the same functions as in the first embodiment discussed above in connection with FIG. 1. Clock control circuit 8A, of FIG. 7, supplies clock signal 9 having frequency f1 at $P \geq a$ or at $N \geq c$. At $b \leq P < a$ or at $d \leq N < c$, clock signal 9 is divided so as to supply a clock signal having a frequency ½ of f1 to CPU 2. At $P < b$ or at $N < d$, clock signal 9 is divided so as to supply a clock signal having a frequency ¼ of f1 to CPU 2. When the clock frequency decided in dependence on the number of holding factors, P, differs from the clock frequency decided in dependence on the number of nestings, N, the clock signal having a higher frequency is supplied to CPU 2. For example, at $b \leq P < a$ and $N < d$, the clock signal having a frequency of ½ of f1 is supplied to CPU 2. In FIG. 6, it is $N < d$ prior to the time t4. Here, as $P < b$ prior to time t1, the clock signal having a frequency of ¼ of f1 is supplied to CPU 2. As $P \geq a$ from time t1 to time t2, the clock signal having a frequency f1 is supplied to CPU 2. From time t2 to time t3, $b \leq P < a$ so that the clock signal having a frequency of ½ of f1 is supplied to CPU 2.

At times t3–t9, $P < b$. Here, at times t3–t4, $N < d$ so that the clock signal having a frequency of ¼ of f1 is supplied to CPU 2. Since $d \leq N < c$ at times t4–t5, the clock signal having a frequency of ½ of f1 is supplied to CPU 2. Since $N \geq c$ at times t5–t6, the clock signal having a frequency f1 is supplied to CPU 2. Since $d \leq N < c$ at times t6–t7, the clock signal having a frequency of ½ of f1 is supplied to CPU 2. Since $N < d$ at times t7–t8, the clock signal having a frequency of ¼ of f1 is supplied to CPU 2. At times t8–t10, $d \leq N < c$, and, further, $P \geq a$, at times t9–t10, so that the clock signal having a frequency of ½ of f1 is supplied to CPU 2 at times t8–t9. Also, at times t9–t10, the clock signal having the frequency f1 is supplied to CPU 2. After time t10, $b \leq P < a$ and, further, $N < d$, so that the clock signal having a frequency ½ of f1 is supplied to CPU 2.

In the above-mentioned second embodiment, two preset values are used for each of the number of holding factors and number of nestings. Further, three different frequencies for the clock signals to be supplied to CPU 2 are provided. However, the number of clock signals of different frequencies to be supplied to CPU 2, and the number of preset values for holding factors and nesting need not be restricted to 2, nor are the values, themselves, restricted to the values used in the description of a preferred embodiment. If preset values are properly selected, the processing time for an interrupt factor can be averaged, thereby minimizing the power consumption. In both the first and second embodiments, the changing of the frequency of clock signal 5 supplied to CPU 2 is designed to be a timing which does not adversely affect the operation of CPU 2.

The microcomputer according to the present invention, as described above, comprises a holding factors register for holding the number of interrupt factors being held by the interrupt controller, an interrupt nesting counter for counting the number of nestings in the interrupt process performed by the central processing unit, and a clock control circuit for changing the frequency of the clock signal supplied to the central processing unit depending on the contents of the holding factors register and the interrupt nesting counter. This provides for the interrupt holding time and the frequency of the clock signal supplied to the central processing unit to be controlled depending on the number of generated interrupt requests. Thus, when multiple interrupts are overlapped, the frequency of the clock signal supplied to the central processing unit is made higher so as to shorten the interrupt holding time. Conversely, when the number of interrupts is small, the frequency of the clock signal supplied to the central processing unit is made lower, thereby reducing power consumption.

What is claimed is:

1. An interrupt processing system including an interrupt controller coupled to a central processing unit (CPU), wherein the interrupt controller is coupled to a plurality of interrupt signals and selects one of the plurality of interrupt signals, wherein the interrupt controller holds the non-selected interrupt signals and outputs the selected interrupt signal to the CPU along with a priority grade for the selected interrupt signal, wherein the CPU processes the selected interrupt according to the priority grade and nests processes with lower priority grades, the system comprising:

a holding factors register means coupled to the interrupt controller for storing a holding number of non-selected interrupt signals which are being held by the interrupt controller;

interrupt nesting counter means coupled to the CPU for storing a nesting number of selected interrupt signals nested in the CPU;

a first clock signal coupled to the CPU when no interrupts are being held or processed, said first clock signal having a first frequency;

a clock control circuit means coupled to the clock signal, the holding factors register means and the interrupt nesting counter means for changing the frequency of the first CPU clock signal in response to the holding number stored in the holding factors register means and the nesting number stored in the interrupt nesting counter means to generate a CPU clock signal which has an increased frequency when the holding number and nesting number have magnitudes of a selected value.

2. The microcomputer according to claim 1, wherein the clock control circuit further comprises:

first register means for holding a first preset value;

second register means for holding a second preset value;

first comparator means coupled, to the first register means and to the holding factors register means and having a first comparator output, for comparing the first preset value with the holding number stored in said holding factors register;

second comparator means, coupled to the second register and to the interrupt nesting counter means and having a second comparator output, for comparing the second preset value with the nesting number stored in said interrupt nesting counter means;

means for providing at least one alternate clock signal having an alternate frequency greater than said first frequency;

decoder means coupled to the outputs of the first and second comparator means for selecting either said first clock signal or said alternate clock signal to change the frequency of the clock signal coupled to the CPU in response to the states of the outputs of the comparators.

* * * * *